Figures 1, 2:
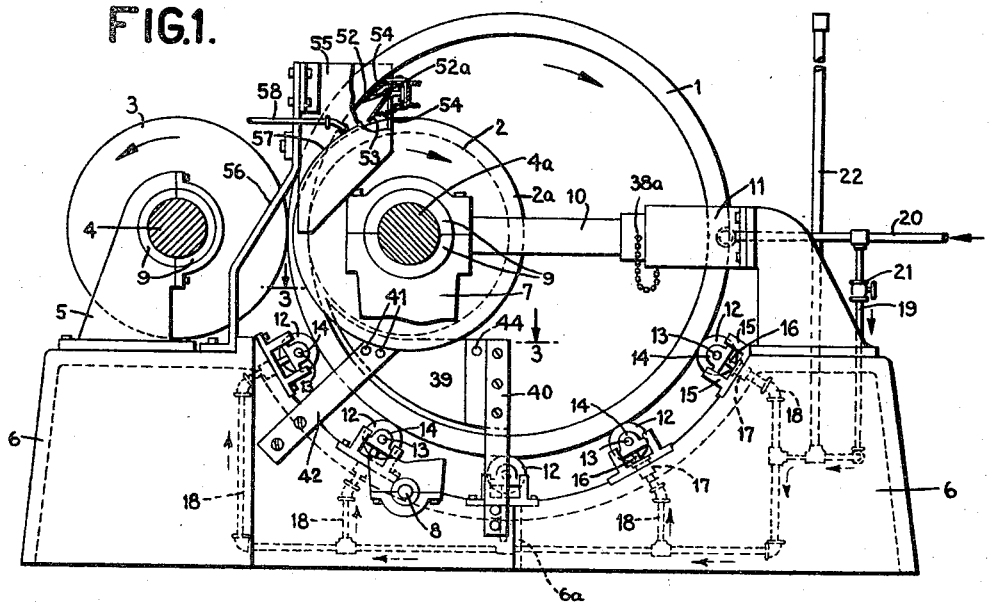

April 28, 1942.  M. J. STACOM  2,281,336
RECOVERY OF RUBBER
Filed March 14, 1938

INVENTOR
MATTHEW J. STACOM
BY Paul R Ames
ATTORNEY

Patented Apr. 28, 1942

2,281,336

UNITED STATES PATENT OFFICE 2,281,336

RECOVERY OF RUBBER

Matthew J. Stacom, Flushing, N. Y., assignor to Stacom Process Corporation, Long Island City, N. Y., a corporation of New York Application March 14, 1938, Serial No. 195,777

21 Claims. (Cl. 260—816)

The present invention is related to the recovery of rubber or rubber-like compounds from various natural sources. In the past rubber and rubber-like compounds have been recovered from various plants and trees containing the compounds, principally by cutting and bleeding the plant or tree.

The present invention is directed to an improvement over such methods whereby the recovery of rubber or rubber-like compounds may be greatly facilitated. Another object of the present invention is to provide a method whereby the rubber may be separated in an improved form. Other objects will become apparent.

In describing the invention particular reference will be made to the recovery of rubber from the guayule plant, although it is not intended to thereby restrict the invention to this particular use.

As a specific example of my improved method, the stalks or branches of the guayule plant or shrub, which had an average diameter of about 1½ inches, were taken in a fairly green state (about 7 days after cutting) and rehabilitated by soaking them in water for 24 hours. The stalks were then subjected to a treatment as described in my application Serial No. 98,208, filed August 27, 1936, and in my copending application Serial No. 195,776, filed March 14, 1938, entitled "Method and apparatus for expressing liquids from solid substances." The horn angle apparatus illustrated in Figs. 1 and 2 of the latter application is suitable for carrying out the pressure step of my method. This apparatus is shown in the accompanying drawing, in which Fig. 1 is a side elevational view of the apparatus, and Fig. 2 is a plan view thereof.

The apparatus illustrated comprises a ring or shell 1, a roller 2 nested within the ring so that its outer surface rolls upon the inner surface of the ring, and an antifriction roller 3, adapted to roll upon the outer surface of the ring 1.

The roller 3 is carried on a shaft 4 which is supported in standards 5, 5 resting upon and fastened to the frame 6 at opposite ends of the roller. The roller 2 is carried on a shaft 4a, which shaft is carried in bearings in the arms 7, 7 pivotally supported from the frame 6 as illustrated at 8. In view of the great pressures on the shafts 4 and 4a, it is preferred to use oilless bearings for these shafts. Such bearings are illustrated at 9, 9.

The roller 2 may be forced toward the inner surface of the ring 1 by means of hydraulic pressure (from a suitable source) applied to pistons 10, 10 terminating at one end in cylinders 11, 11 and at the other end bearing upon the supports 7, 7 for the roller 2. The pipe 20, leading to the cylinders 11, may be connected to a differential piston hydraulic-gas system as described in my application Serial No. 195,776 aforesaid. The pressure applied to the supports 7, 7 forces the roller 2 and the ring 1 against the antifriction roller 3 supported in the standards 5, 5 fixed to the base 6.

The pressure forcing the roller 2 toward the roller 3 may be relied upon to yieldingly support the ring 1. As the material being treated is passed through the machine the pressure will cause the ring 1 to dip, resulting in important advantages because of the change in the position of the lower and upper horn angles (i. e. the curvilinear angles between the surfaces of the roller 2 and the ring 1). For some uses it is preferred to provide additional yielding supports, such as the antifriction rollers 12, 12. Each of these rollers is carried on a shaft 13 in bearing block 14, 14 on the opposite sides of the roller, which blocks slide in guides 15, 15 fixed to the frame 6. The blocks 14 are each fixed to the end of a piston 16, which piston terminates at the other end in a cylinder 17 fixed to the frame 6. If desired, adjustable stops, such as set screws, may be provided for regulating the outward movement of the blocks 14. Hydraulic pressure may be applied to the cylinders 17 from an independent source or through the pipes 18 connected, through the pipe 19, to the main pressure line 20 leading to the cylinders 11. If the latter arrangement is used it is desirable to have the rollers 12 move independently of the main pressure system so a valve 21 is provided in the line 19. An air trap, consisting of a closed pipe 22 connected to the pipe 19, is provided to give a yielding pressure upon the rollers 12. In preparing to use the rollers 12, the valve 21 is opened and liquid admitted, whereby sufficient pressure is applied to the pistons 16 to raise the ring 1 to the desired position when the pressure on the cylinders 11 is released. When adjustable or other stops are provided, the ring may be raised until the blocks 14 hit the stops and the air in 22 is sufficiently compressed to provide the desired resistance to movement of the ring. The valve 21 is then closed and the air confined within the trap 22 serves to provide a yielding resistance to downward movement of the ring 1 in use.

When the antifriction rollers 12 are provided to support the ring 1, pins 38a, 38a extending through registering holes in pistons 16 and collars surrounding the pistons, are provided so as to retain the pistons in position when the pressure in the trap 22 is adjusted and to keep the roller slightly separated from the ring when not in use, whereby the parts may be relieved from strain when not in use.

If desired, the roller 2 may be provided with annular flanges 2a on each side and adapted to fit close to the edges of the ring 1. These flanges serve to guide the ring 1 and to prevent the extrusion from between the ring and roller of any of the material being treated. Also, because the flange moves with the ring, any material contacting it from between the roll and the ring will contact a surface moving in the same direction rather than a fixed guide.

Guide plates 39, 39 may be provided for guiding the material being processed to the desired section of the pressure zone and to prevent turning of the material as it enters this zone. The guide plates 39, 39 may be supported at their rear ends by the supports 40, 40 fixed to the frame 6 and at their front ends by the rods 41. A tie rod 44 may be provided for bracing and properly spacing the rear ends of the plates 39.

A pair of scrapers 52 and 53 hinged together at 52a may be drawn against the ring and the roller surfaces, respectively, by springs 54. A plate 55 may be supported from the frame 6 by a bracket 56. This plate is shaped to fit close to the edge of the ring 1 and the edges of the scrapers 52 and 53, and may be recessed at 57 to receive the rim 2a of the roller 2, if such a rim is used. A jet of air may be delivered by the pipe 58 to a nozzle positioned in the space enclosed by the scrapers 52 and 53 and the surfaces of the roller 2 and the ring 1. A conduit 59 may be provided at the opposite end of the roller 2 to receive the material removed from the surfaces by the scrapers and blown by the air jet.

The guayule stalks, after being taken in a fairly green state (about 7 days old) and being rehabilitated by soaking them in water for 24 hours, as previously described, were fed longitudinally through the horn angle apparatus just described. The stalks were advanced longitudinally (toward their butt ends) between the external annular imperforate surface of the roller 2 and the internal annular imperforate surface of the ring 1, both the roller and ring rotating in a clockwise direction with said surfaces advancing upwardly at the line of closest contact, which was located in the same horizontal plane as the axes of rotation of the ring and roller.

During the passage of the guayule through the horn angle apparatus, it was subjected to a pressure of about 55,000 to 65,000 pounds spread over a roll surface 8 inches long. The roller used had an external diameter of about 10 inches and the ring had an internal diameter of about 20 inches. The ring and roller rotated at the same peripheral speed, namely, at the rate of about four revolutions per minute for the ring. With the plants treated, the total width of material passing between the pressure surfaces at any one time varied from about 1 to 3 inches, giving a range of pressures varying between about 18,000 to 65,000 pounds per lineal inch of width of the material fed to the machine.

The fluids ran down the inner ring surface and were caught in a receptacle beneath the ring. Since the fluids were quite sticky and viscous, in order to expedite their flow from the pressure zone a spray of water was applied to the ring approximately at the point at which it gripped the shrub fed to it. Shrubs cut after the rainy season and containing a greater quantity of water may be sufficiently fluid without this added water.

The fluids recovered in this way may be screened to remove particles of fibre or other solid matter and subjected to treatment for the recovery of rubber as hereinafter described or by some other suitable procedure.

The cellulose resulting from the treatment described above may be used in the preparation of wall board or insulating plastics and various types of heavy paper and board. By further treatment and separation of the particles of bark, it may also be used in the preparation of finer grades of paper and in the preparation of cellulosic solutions for the production of rayon etc.

Various pressures may be applied in the separation of the fluids, depending upon the condition of the material treated and upon the use to which the resulting cellulosic fibres are to be put. For example, when the material is treated directly on being cut, less pressure may be required to obtain the desired separation than when allowed to stand longer. Also, lower pressures may be used with a younger shrub or when they are cut at a time at which they contain more water. Higher pressures may be desirable with older plants or plants containing less liquid. Of course, different pressures may also be required in the treatment of other types of rubber-containing shrubs, plants and woods. Also, where long fibres are desired in the cellulose product, it is desirable to use lower pressures than when short fibres are to be obtained. Pressures of 10,000 to 100,000 pounds per lineal inch or even lower or higher may be used. It is preferred, however, to use pressures of about 20,000 to 64,000 pounds per lineal inch.

The fluids recovered by this treatment are in the form of an emulsion or colloidal suspension which, upon standing, will precipitate rubber, together with other constituents. The precipitation of the rubber that is in colloidal suspension may be hastened by boiling the extract. For example, by boiling from 3 to 5 minutes, without any addition of chemical reagent, a quantity of solid crude rubber equal to about 25% by weight of the fluid, was separated.

By subjecting the fluids extracted from the gayule plant to a low temperature (about 28° F.), the emulsion will separate into three distinct layers. The bottom layer is dark in color, the center layer a light gray and the top layer is dark. The various layers may be separated and separately subjected to boiling or other treatment. By this treatment rubber of various degrees of purity may be recovered from the liquid portions. As indicative of the various grades of rubber so separated, sample No. 1, which was rubber separated by boiling the liquid expressed (without any separation into layers), was black and rather resilient (it would bounce about 40% of the height dropped) and contained a considerable quantity of resins and other impurities. Sample No. 2, which was precipitated by boiling the lower layer resulting from the cold separation referred to above, was softer and blacker than sample No. 1. It would only bounce about 20% of the height dropped and contained a greater proportion of resins, etc. Sample No. 3, which was separated by boiling (together) the upper two layers of the above mentioned cold separation, was fairly light in color and considerably more resilient than sample No. 1. It bounced about 60% of the height dropped and contained less resins, etc. Thus it is apparent that by the procedure described the preliminary purification of the crude rubber may be accomplished with a concentration of the resinous materials and other impurities in the heavier fraction.

Another means for purifying the rubber is to treat the emulsion resulting from the pressing operation with a non-solvent for rubber such as acetone, whereupon the rubber will be precipitated and the acetone soluble fats, oils and resins may be removed in the acetone fraction. The acetone can be distilled off and recovered for re-use. After the separation of the acetone from the liquid portion, the water remaining may be evaporated off under vacuum to recover the fats, oils and resins contained in the original emulsified fluid. These may be readily separated for subsequent treatment or disposal.

The acetone treatment may also be used in connection with the cold separation. That is, the emulsion may be subjected to low temperatures and the various fractions resulting therefrom may be treated with acetone to precipitate the pure rubber and dissolve the acetone soluble impurities. Also, the acetone treatment may be combined with the boiling treatment. For example, after the boiling treatment, the hot fluids may be withdrawn from the rubber as soon as the latter is coagulated and acetone added before the pores of the rubber have a chance to knit close together. Similarly, the cold separation, boiling and acetone treatment of the coagulated rubber may be used together.

Various other methods may be used in the separation of the rubber from the fluids expressed as described above. For instance, heat and/or smoke or other gases containing volatile acids and creosote or formaldehyde may be used to coagulate the rubber. Or the emulsion may be broken down by fermentation of the contained elements which keep the rubber from coagulating. Also, the fluids may be separated by centrifugal separation, with further dilution, if necessary.

The separation of rubber and rubber-like compounds may be accomplished in a similar manner from other substances containing it. For instance, the treatment may be applied to golden rod (*Solidago leavenworthii*), desert milkweed (*Asclepias subulata*), Indian hemp, rabbit brush (*Chrysothamnus nauseosus*), Colorado rubber plant (pinguay, *Hymenoxys sloribunda utilis*), or from various other plants and trees containing rubber, such as plants belonging to the orders Euphorbiaceae, Apocynaceae, Artocarpaceae, Moraceae, Compositae, Convulvulaceae, Asclepiadaceae, Havea (*Hevea brasiliensis*), Manihot, Vahea, Landolphia, Castilloa, Jelutong, Pontianak, Hancornia, Ficus and Funtumia. Other rubber-like compounds may be recovered in a similar manner; for example, balata may be recovered from *Mimusops kauki*, L. or *Mimusopa globosa*; gutta percha may be recovered from Isonandra and *Dichopsis gutta*; chicle may be recovered from *Achras sapota*.

In the case of trees or large plants, it may be necessary to cut the wood into strips or sheets, preferably longitudinally of the grain, or the treatment may be applied to the branches and tops or leaves of such trees or plants. Also the roots of the various shrubs, plants, and trees referred to above may be processed as described herein to recover rubber contained in them.

Also, it may be desirable to subject the wood, shrub, plant or grass to imbibition in solvents for rubber before the pressure treatment. This may be particularly useful in the treatment of wood or plant that has stood for some time. Benzol or carbon bisulfide may be used for this purpose and heat may be applied. The wood or plants may also be subjected to imbibition with a solvent such as acetone, that will dissolve the resins and other constituents of the fluids but not the rubber. Then the rubber may be separated in a purer state from the expressed fluids.

The rubber or rubber-like compound recovered from the various plants, shrubs, grasses and trees as described above may be washed, worked, vulcanized and otherwise treated in the customary manner in the preparation of products from it.

The plants and tree wood are preferably treated as soon as possible after they are cut and at a time when the rubber content of the fluid is the greatest. Because of this, or for other reasons, it may be desirable to have the apparatus on a portable frame so that it can be quickly moved to the vicinity of the cutting at the appropriate time. If the material is not treated promptly, it may be advantageous to soak it in water 24 to 48 hours before it is treated. The presence of fluid in the material being treated is important, since it provides a cushion preventing crushing and closing of the pores or cells of the fibre structure. Also, it provides means for bringing about the disruption of the cells and pores from within whereby a porous fibrillated cellulosic product results. It also provides a vehicle for the rubber and for the heat units developed in the high pressure zone, whereby overheating of the cellulose and possible coagulation of the rubber, by the very high pressures applied, may be avoided.

A marked improvement in the quality and quantity of rubber recovered is obtained when the plant is not allowed to stand more than a few days after it is harvested. Also, it is preferred to cut it about two to three weeks after the rainy season. Although the rubber appears to deteriorate on standing after it is cut, the rubber in the separated fluid is less subject to deterioration. Thus the fluid and the various layers separated by cooling may be stored or shipped without excessive loss of the quality or quantity of the rubber.

Particular examples of the pressure apparatus and process have been referred to, but it is not intended to thereby restrict the invention to the particular embodiments described, it being apparent that the improved method may be carried out in other forms of apparatus.

In order to conserve the soil the fluids from which the rubber is separated may be returned to the soil to enrich it for future growth. Also, it may be desirable to return the cellulose to the soil rather than to convert it into other products as described above. Or it may be burned as fuel.

The terms used in describing the invention have been used in an illustrative sense and not as terms of limitation and it is intended that all equivalents thereof be included within the scope of the appended claims.

In using the term "rubber" in the appended claims, it is intended to include rubber, balata, gutta percha, chicle and other compounds of similar characteristics. In using the term "plant" it is intended to include trees and tree wood, as well as shrubs, grasses, etc. In referring to the treatment of a material having its normal or natural cellular structure, it is of course intended to include the treatment of portions of trees and large plants cut to a desirable size, as distinguished from pieces of wood crushed in such a manner as to alter its cellular structure.

I claim:

1. In the recovery of rubber from rubber-bearing plants, the step of subjecting the plant having substantially its normal amount of liquid and its normal cellular structure to about 5,000 to 100,000 pounds pressure per lineal inch of width of the matter to which the pressure is applied to express and separate rubber therefrom in a fluid fraction by a single application of the pressure.

2. In the recovery of rubber from rubber-bearing plants, the step of subjecting the plant having substantially its normal amount of liquid and its normal cellular structure to about 20,000 to 65,000 pounds pressure per lineal inch of width of the matter to which the pressure is applied to express and separate rubber therefrom in a fluid fraction by a single application of the pressure.

3. In the recovery of rubber, the steps of cutting the growing guayule plant, immersing it in water, removing it from the water, subjecting it to pressures of about 20,000 to 65,000 pounds per lineal inch to express rubber therefrom in a fluid fraction by a single application of the pressure and coagulating rubber contained in the expressed fluids.

4. In the recovery of rubber, the steps of cutting the growing guayule plant and within a week from the time the plant is cut passing it upwardly and longitudinally of its grain and toward its butt end, between an internal imperforate surface and an external imperforate surface forced toward it under a pressure of about 55,000 to 65,000 pounds to express rubber therefrom in a fluid fraction by a single application of the pressure and coagulating rubber contained in the expressed fluids.

5. In the recovery of rubber from rubber-bearing plants, the step of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone.

6. In the recovery of rubber from rubber-bearing plants, the steps of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, and coagulating the rubber contained in the expressed fluids.

7. In the recovery of rubber from rubber-bearing plants, the steps of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, and heating the expressed fluids to coagulate the rubber.

8. In the recovery of rubber from rubber-bearing plants, the steps of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, and adding a liquid non-solvent coagulant for the rubber to the expressed fluid.

9. In the recovery of rubber from rubber-bearing plants, the steps of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, and adding acetone to the expressed fluids.

10. In the recovery of rubber from rubber-bearing plants, the step of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, said pressure being applied longitudinally of the fibres of the plant.

11. In the recovery of rubber from rubber-bearing plants, the step of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, said pressure being applied longitudinally of the fibres of the plant toward the butt end thereof.

12. In the recovery of rubber from rubber-bearing plants, the steps of cutting the growing plant and within two weeks of the cutting thereof progressively applying thereto, while it still contains substantially its normal content of liquid and has substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone.

13. In the recovery of rubber from guayule, the step of progressively applying to the guayule, containing substantially its normal content of liquid and having substantially its natural cellular structure, yielding pressure of at least about 5000 pounds per lineal inch of width of material being treated to express the major portion of the rubber in a fluid state in a single application of the pressure, while allowing the expressed fluid to flow quickly away from the high pressure zone.

14. In the recovery of rubber from rubber-bearing plants, the steps of progressively applying to the plant, containing substantially its normal content of liquid and having substantially its natural cellular structure, yielding pressure of at least about 5000 pounds per lineal inch of width of material being treated to express the major portion of the liquid content of the plant in a fluid state in a single application of the pressure, while allowing the expressed liquid to flow quickly away from the high pressure zone, and fermenting the expressed fluid to coagulate the rubber.

15. In the recovery of rubber from rubber-bearing plants, the steps of subjecting the plant having substantially its normal amount of liquids and its normal cellular structure to pressures of at least about 10,000 pounds per lineal inch of material being treated to express rubber therefrom in a fluid fraction by a single application of the pressure, cooling the expressed fluid fraction to separate it into layers, separating the layers and treating at least one of the separated layers to recover the rubber therein.

16. In the recovery of rubber from rubber-bearing plants, the steps of subjecting the plant having substantially its normal amount of liquids and its normal cellular structure to pressures of at least about 10,000 pounds per lineal inch of material being treated to express rubber therefrom in a fluid fraction by a single application of the pressure, cooling the expressed fluid fraction to separate it into layers, separating the layers and treating at least one of the separated layers with an agent adapted to coagulate the rubber therein.

17. In the recovery of rubber from rubber-bearing plants, the steps of subjecting the plant having substantially its normal amount of liquids and its normal cellular structure to pressures of at least about 10,000 pounds per lineal inch of material being treated to express rubber therefrom in a fluid fraction by a single application of the pressure, cooling the expressed fluid fraction to separate it into layers, separating the layers and heating at least one of the separated layers to coagulate the rubber therein.

18. In the recovery of rubber from rubber-bearing plants, the steps of subjecting the plant having substantially its normal amount of liquids and its normal cellular structure to pressures of at least about 10,000 pounds per lineal inch of material being treated to express rubber therefrom in a fluid fraction by a single application of the pressure, cooling the expressed fluid fraction to separate it into layers, separating the layers and treating at least one of the separated layers with a non-solvent coagulant for rubber.

19. In the recovery of rubber from rubber-bearing plants, the steps of subjecting the plant having substantially its normal amount of liquids and its normal cellular structure to pressures of at least about 10,000 pounds per lineal inch of material being treated to express rubber therefrom in a fluid fraction by a single application of the pressure, cooling the expressed fluid fraction to separate it into layers, separating the layers and treating at least one of the separated layers with acetone.

20. In the recovery of rubber from rubber-bearing plants, the steps of cutting the growing plant, immersing it in water, removing it from the water, progressively applying to the soaked plant having substantially its normal cellular structure yielding pressures of at least about 5000 pounds per lineal inch of width of material being treated to express the major portion of the liquid content of the plant in a fluid state in a single application of the pressure, while allowing the expressed liquid to flow quickly away from the high pressure zone.

21. In the recovery of rubber from guayule, the steps of cutting the growing guayule plant, immersing it in water, removing it from the water after soaking for at least twenty-four hours, subjecting the soaked plant having substantially its normal cellular structure to yielding pressures of at least about 10,000 pounds per lineal inch of width of material being treated to express and separate rubber therefrom in a fluid fraction by a single application of the pressure, and separating rubber contained in the expressed fluids.

MATTHEW J. STACOM.